United States Patent
Swanson (10) Patent No.: US 7,072,778 B2
(45) Date of Patent: *Jul. 4, 2006

(54) METHOD AND SYSTEM FOR DETERMINING A ROTOR POSITION IN A WOUND FIELD DC MOTOR

(75) Inventor: David F. Swanson, Novi, MI (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/870,252

(22) Filed: Jun. 17, 2004

(65) Prior Publication Data

US 2005/0283324 A1    Dec. 22, 2005

(51) Int. Cl.
*G01R 25/00* (2006.01)
(52) U.S. Cl. .......................................... 702/57; 702/65
(58) Field of Classification Search ................. 702/57, 702/64, 65; 318/138, 254, 439
See application file for complete search history.

(56) References Cited

U.S. PATENT DOCUMENTS

| | | | | |
|---|---|---|---|---|
| 5,028,852 | A | * 7/1991 | Dunfield | 318/254 |
| 5,254,914 | A | * 10/1993 | Dunfield et al. | 318/254 |
| 5,841,252 | A | * 11/1998 | Dunfield | 318/254 |
| 6,249,101 | B1 | 6/2001 | Viti et al. | |
| 6,392,577 | B1 | 5/2002 | Swanson et al. | |
| 6,426,607 | B1 | 7/2002 | Merlo et al. | |
| 6,703,805 | B1 | 3/2004 | Griffitts | |

OTHER PUBLICATIONS

Libor Prokop; Sensorless BLDC Motor Control Using the MC68HC908MR32; Designer Reference Manual; Mar. 2003; pp. 38-41; Motorola Czech System Laboratories, Czech Republic.

Schmidt, et al.; Initial Rotor Angle Detection of a Non-Salient Pole Permanent Magnet Synchronous Machine; IEEE Industry Applications SocietyAnnual Meeting; 1997; pp. 1-5; Rockwell Automation, Milwaukee, WN.

The Smart Start Technique for BLDC Motors; Application Brief 42020;Sep. 1996 rev. Oct. 25, 2000; pp. 1-5; Fairchild Semiconductor; www.fairchildsemi..com.

(Continued)

*Primary Examiner*—Bryan Bui
(74) *Attorney, Agent, or Firm*—Lisa K. Jorgenson; Bruce Terry (57) ABSTRACT

A method for determining a rotor position in a DC motor having a plurality of windings, including a rotor winding and a plurality of stator windings begins with producing a changing current flow in a pulsed winding to induce a response signal in other windings of the motor. The pulsed winding may be the rotor winding or selected ones of the stator windings. If the pulsed winding is the rotor winding, response signals induced in at least two of the stator windings are analyzed compute the rotor position. If the pulsed winding is the stator winding, response signals induced from pulsing at least two stator windings are sensed in the rotor winding and analyzed compute the rotor position. A system for computing a rotor position may include comparators for comparing induced response signals in stator windings.

15 Claims, 5 Drawing Sheets

OTHER PUBLICATIONS

Narasimhamurthi, et al; CEEP Report Brief; Control Strategy for Integrated Alternator-Starter; Jun. 5, 2001; pp. 1-2; The University of Michigan.

Padmaraja Yedamale; Microchip AN885; Brushless DC (BLDC) Motor Fundamentals; 2003; pp. 1-20; Microchip Technology Inc.

G. Grasso V. Marino; Brushless DC Motor; Sensorless Fuzzy Control by ST52X420; ST AN1327 Application Note; Dec. 2000; pp. 1-19; STMicroelectronics, Inc.; www.st.com.

Johnathan Griffitts; Sensorless Motor Control For Tape Drives; Oct. 9, 2001; pp. 1-18; THIC meeting Westcoast Silverdale Hotel, Silverdale WA.

Don Putning; V for Vector; Mar. 26, 1993; pp. 1-4; Vector-Controlled Drives; Penton Publishing, Inc., Cleveland, OH 44114.

Microcontroller Division Applications; An Intro. To Sensorless Brushless DC Motor Drive ApplST AN1130 Application Note; 2000; pp. 1-29; STMicroelectronics, Inc.; www.st.com.

* cited by examiner

METHOD AND SYSTEM FOR DETERMINING A ROTOR POSITION IN A WOUND FIELD DC MOTOR

BACKGROUND OF THE INVENTION

1. Field of the Invention

The present invention relates generally to electric motor controls, and more specifically to detecting the position of a wound field rotor in a direct current motor.

2. Description of the Prior Art

Electric motors are an essential component of our industrialized society. One type of electric motor, the brushless DC (BLDC) motor, is already used in hard disk drives and many industrial applications, and its market share is growing significantly in automotive, appliance, and industrial applications.

Mechanically, BLDC motors consist of two coaxial magnetic armatures separated by an air gap. In certain types of motor, the external armature, which is called the stator, is fixed, and the internal armature, which is called the rotor, is mobile in that it rotates.

BLDC motors are a type of synchronous motor, which means that the magnetic field generated by the stator and the magnetic field generated by the rotor rotate at the same frequency. BLDC motors do not experience the "slip" that is normally seen in induction motors. As the name implies, "brushless" DC motors do not use brushes for commutation, which is the cyclic switching to produce the rotation of the magnetic field; instead, the motor is electronically commutated.

Because there is no slip between the rotation of the rotor and the stator magnetic field, it is important to know the angular position of the rotor in order to properly position the magnetic field in the stator so that it will continue to magnetically pull and push the rotor in the direction of rotation.

Figure 1:
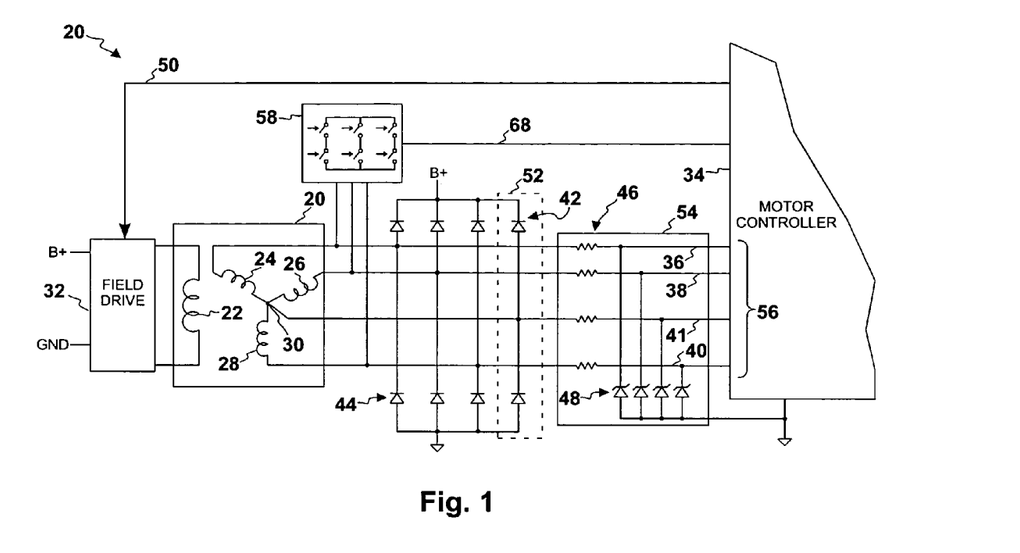
FIG. 1 is a high-level schematic diagram of an alternator, which may be used as a DC motor with rotor position sensing in accordance with the method and system of the present invention.

In a typical three-phase BLDC motor, each of three stator magnetic fields, or phases, is angularly spaced apart 120°, as shown at stator windings 24–28 in FIG. 1. Torque is produced because of magnetic interaction between the rotor magnetic field and the stator magnetic field. Torque occurs if the two fields are in the correct position with respect to each other. Peak torque occurs when the fields are ninety degrees apart, and falls off as the fields move closer toward alignment. In order to keep the motor running, the field produced by the stator coils must shift position, or commutate as the rotor moves to catch up. BLDC motors are traditionally commutated in a six-step pattern that controls power through a three-phase inverter. The inverter excites only two out of three phases at one time, leaving the third winding floating.

Commutation timing may be determined by position sensors on the rotor, or by a "sensorless" method of sensing back-electromotive force (back EMF) as the moving rotor influences the unused stator windings. If sensors are used, the position sensors or transducers can be Hall-effect magnetic sensors, resolvers, synchros, optical encoders, or similar absolute position sensors. These sensors increase the cost and the size of the motor, and special mechanical arrangements are necessary for mounting the sensors. Some of the sensors, particularly Hall sensors, may temperature sensitive, limiting their high-end operating temperature. Position sensors reduce the system reliability because they add components and wiring. In some applications, it is difficult to find a place to mount a position sensor on the rotor.

The sensorless drive is preferred because it reduces cost and complexity of the drive system. This method detects the position of the rotor by sensing back EMF zero-crossing events, which can only be done when the rotor is rotating. This is because back EMF in the stator windings are produced by a moving rotor's magnetic field in relation to the stator winding that is being sensed. When the magnetic field in the rotor is stationary, as it is the instant before the motor is started, traditional back EMF signals cannot be used to detect the rotor position.

If a BLDC motor does not have sensors to detect the position of a stationary rotor before start up, the rotor may be pre-positioned to a known position during a first phase of a start up process. The rotor is moved to a known position by energizing the stator winding in a particular way. Once pre-positioned, a starting ramp table is used to provide a special commutation rate to accelerate the rotor until it is possible to detect back EMF voltage in the floating winding to establish a commutation switching timing in the synchronous mode.

In some BLDC motors the magnetic field of the internal rotor is produced by a permanent magnet that is part of the rotor. In motors referred to as a "wound rotor," or "wound field" BLDC motor, the rotor magnetic field is created by a current in a winding in the rotor.

There is a mechanical similarity between motors and generators, and a relationship between mechanical and electrical energy. A machine is classified as a motor if it converts electrical energy to mechanical form, and a machine acts as a generator if it converts mechanical energy from a prime mover to an electrical form. For example, an automotive alternator converts mechanical energy from the car engine to electricity for charging the battery and operating other accessories.

The relationship between electric and magnetic fields and the physical similarities between generators and motors makes it possible for the same mechanical machine to operate as either a generator or a motor. For example, an ordinary automobile alternator that commonly generates electrical energy may be operated as a wound field brushless motor by properly switching magnetic fields in the stator while producing a constant magnetic field in the wound rotor. Operating an alternator as a motor may be useful in starting the vehicle engine, or in assisting the engine by adding extra torque to the engine. If the alternator could perform double duty and also provide the starting torque to the engine, automobile designers could eliminate the starter motor to reduce weight, cost, and complexity.

In some applications, such as starting an automobile engine, the pre-positioning method of starting a BLDC motor is not practical because reverse rotor rotation is not allowed, and pre-positioning requires reverse rotation about 50% of the time due to the random position of the rotor when the motor stops. The position of the rotor must be known to initially apply maximum torque and always start the rotor in the forward direction.

Therefore, it should be apparent that there is a need for an improved method and system that does not use added sensors for determining the position of a wound field rotor when the rotor is stationary before starting, or otherwise turning slowly and unable to produce back EMF signals for sensing on a stator winding.

SUMMARY OF THE INVENTION

The present invention provides a method for determining a rotor position in a DC motor having a plurality of windings, including a rotor winding and a plurality of stator windings. A changing current flow is produced in a pulsed winding to induce a response signal in other windings of the motor. The pulsed winding may be the rotor winding or selected ones of the stator windings. If the pulsed winding is the rotor winding, response signals induced in at least two of the stator windings are analyzed compute the rotor position. If the pulsed winding is the stator winding, response signals induced from pulsing at least two stator windings are sensed in the rotor winding and analyzed compute the rotor position.

The present invention further provides a system for pulsing selected windings of a wound-rotor BLDC motor and sensing and analyzing signals induced in other non-pulsed windings. The analysis may be implemented in a signal processor with either analog or digital computations or comparisons of signals. Field drive and stator drive circuits are adapted to provide pulses and to provide an open or high independence state to permit selected signal measurements.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which.

DESCRIPTION OF THE PREFERRED EMBODIMENTS

With reference now to the drawings, and in particular with reference to FIG. 1, there is depicted a high-level schematic diagram of a wound field brushless DC (BLDC) motor. Note that the schematic of FIG. 1 also includes many components in common with a prior art alternator, which is conventionally used in an automobile to charge the battery and provide electrical power.

As illustrated in FIG. 1, BLDC motor 20 includes several windings for producing magnetic fields, including rotor winding 22 and stator windings 24–28. Stator windings 24–28 are configured as a three-phase wye-wound stator. In the wye configuration, windings 24–28 are connected to one another at common node 30.

Rotor winding 22 is supplied with current by field drive circuit 32. Field drive circuit 32 may include transistors and other components, such as MOSFETs, and a diode, which may be controlled by a rotor drive control signal 50 to switch or otherwise control the flow of current through rotor winding 22.

Stator drive circuit 58, which may also use transistor and other components similar to field drive circuit 32, may be used to switch current in either direction through selected pairs of stator windings 24–28 in a six-stage cycle that is conventionally known for driving three-phase BLDC motors. This switching cycle of stator drive circuit 58 may be controlled by stator drive control signals 68 from motor controller 34. In an alternate embodiment, stator drive circuit 58 may also have a connection (not shown) to common node 30 and circuitry necessary for driving current through a single selected stator winding 24–28 while leaving two non-selected windings floating.

Motor controller 34 includes analyzing logic and circuits for generating control signals that may be used to properly start and run BLDC motor 20 by determining the rotor position and commutating the power. An example of an implementation of motor controller 34 is the motor control integrated circuit made by STMicroelectronics N.V. and sold under part number ST72141, and similar additional components in the ST72MC family of controllers designed for brushless motor applications. Once rotor winding 22 is turning above a threshold speed, motor controller 34 is able to detect the zero crossings of the back EMF on the undriven phase by sensing the voltage of that stator winding (the undriven one of 24–28) using stator sense signals 36–40. Resistors 46, and zener diodes 48 provide signal conditioning and over voltage protection for sensing circuits inside motor controller 34.

In some circumstances, it is desirable to use BLDC motor 20 as an alternator. For example, in an automotive application, the same windings and rotor of BLDC motor 20 may be used as a starter motor to start a car engine, and then be converted to an alternator to provide an electrical power source to charge the battery and operate electrical devices. When BLDC motor 20 is used as an alternator, diodes 42 and 44 rectify the generated current.

Figure 2:
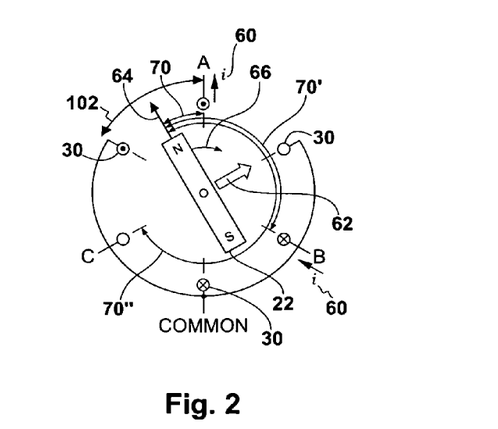
FIG. 2 is a schematic representation of a phasor diagram indicating the relationship between magnetic fields in a rotor and a stator in electrical degrees.

Referring now to FIG. 2, there is depicted a schematic diagram of the relationship between magnetic fields in a wye-connected stator and the magnetic field of a wound field rotor. During motor operation, stator windings 24–28 (see FIG. 1) are typically driven two at a time, with the third stator winding left open and floating. In FIG. 2, stator current 60 flows into terminal B and out from terminal A (as indicated by the "x" symbol on terminal B and the "dot" symbol on terminal A), and produces stator magnetic flux vector 62. Note that current is also shown flowing into and out of common node 30, because all stator windings, including windings connected to terminals A and B, are connected to common node 30 (simultaneously into and out of common node 30) and the current out of winding B flows through common node 30 and into winding A.

Current flowing through rotor winding 22 produces rotor magnetic flux vector 64. Interaction between stator and rotor magnetic flux vectors 62 and 64 produces torque force 66, which is a force that attempts to align rotor flux vector 64 with stator flux vector 62. Torque force 66 causes rotor 22 to rotate at the rotational speed of stator magnetic flux vector 62.

Figure 3:
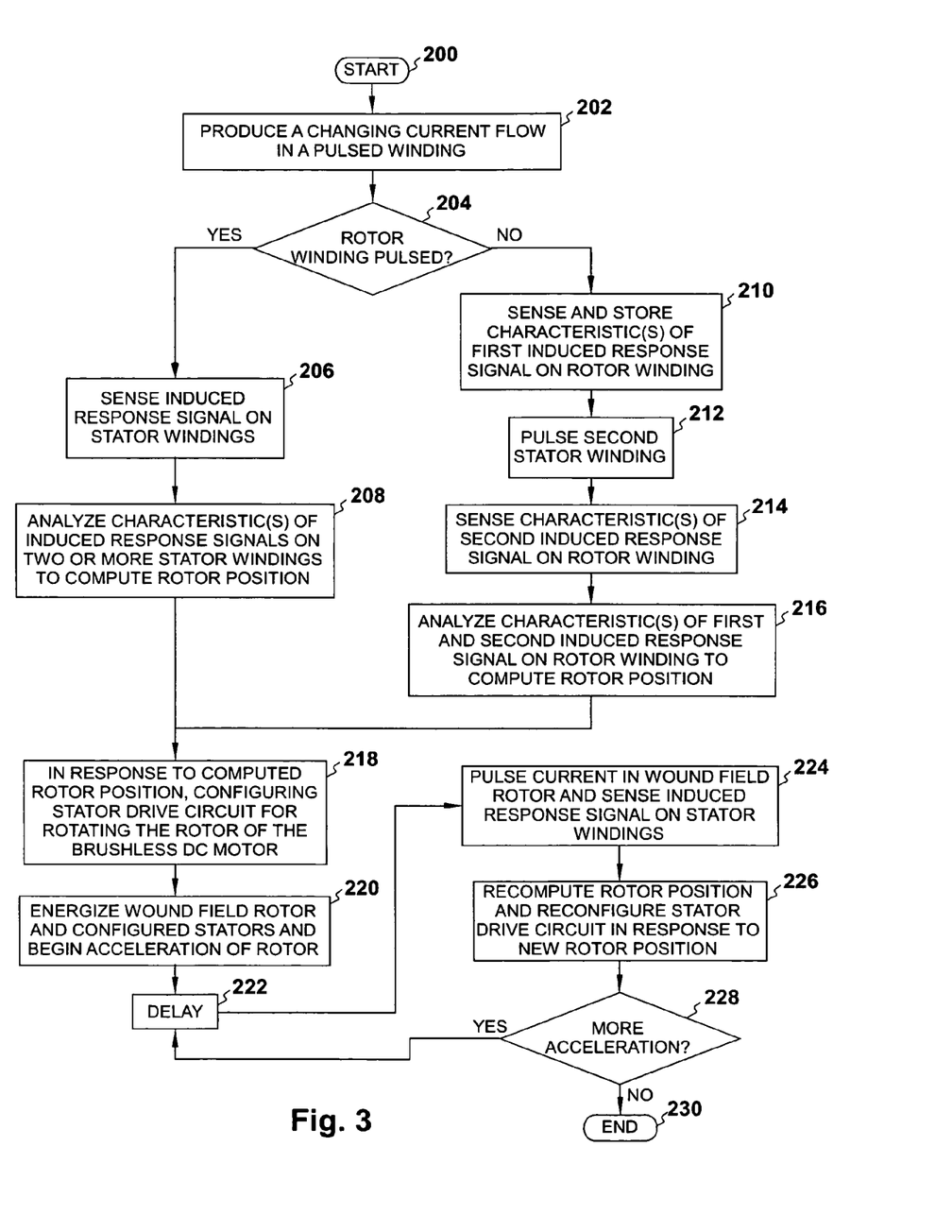
FIG. 3 is a high-level logic flowchart of the process of determining a rotor position in a direct current motor in accordance with the method and system of the present invention.

Referring now to FIG. 3, there is depicted a high-level logical flowchart of the method and operation of determining a rotor position in accordance with the present invention. As illustrated, the process begins at block 200 and thereafter passes to block 202 wherein the process produces a changing current flow in a pulsed winding to induce a response signal in the other windings of the wound field brushless DC motor. In a preferred embodiment, a voltage pulse applied to the winding to produce a current changing at constant or linear rate in the pulsed winding. The inductance in the winding causes the current to maintain a constant rate of change for the duration of the pulse. As used herein, a "voltage pulse" is a transient variation of voltage, which may be a positive variation from a lower to a higher voltage, or a negative variation from a higher to a lower voltage. The pulse is preferably less than 10 milliseconds.

The purpose of the changing current is to induce a response signal in the other windings in the BLDC motor. An induced response is produced by the inductive coupling of magnetic energy from the pulsed winding to the other windings. As an example, a three-phase wound rotor BLDC motor may have four windings: three stator windings and one rotor winding. In step 202, either the rotor winding or a selected stator winding may be pulsed. A current that has a constant rate of change induces a constant voltage in the other windings.

At block 204, the process branches depending on whether or not the rotor winding was pulsed in block 202 or a stator winding was pulsed. If the rotor winding was pulsed, the process follows the "yes" branch to block 206, wherein the process senses the induced response signals on two or more stator windings. This sensing step may be implemented by connecting sensing inputs 56 of motor controller 34 to signals from each stator winding 36–40, and optionally signal 41 from the common node 30, as illustrated in FIG. 1. Signals 36–40 induced in stator windings 24–28 are conditioned and limited by back EMF detection circuit 54, which may include various components for conditioning or modifying the induced signals. Signal 41 from common node 30 may be input into motor controller 34 to provide a reference signal for measuring the induced signals 36–40 on stators 24–28.

The purpose of the sensing step in block 206 is to capture parameters or characteristics of the induced response signals so that the signals can be analyzed by comparing them to predetermined model signals or predetermined calculations, or by comparing them to characteristics of other sensed signals, or by using other similar means of analysis. The signal sensing step may include analog to digital conversion, filtering, or sampling and holding a peak value. Characteristics that may be used in analysis include the polarity of the induced signal at a specific point in time and the peak voltage magnitude of the induced signal.

Next, the process analyzes characteristics of the induced response signals on two or more stator windings to compute the rotor position, as illustrated at block 208.

Figure 4:
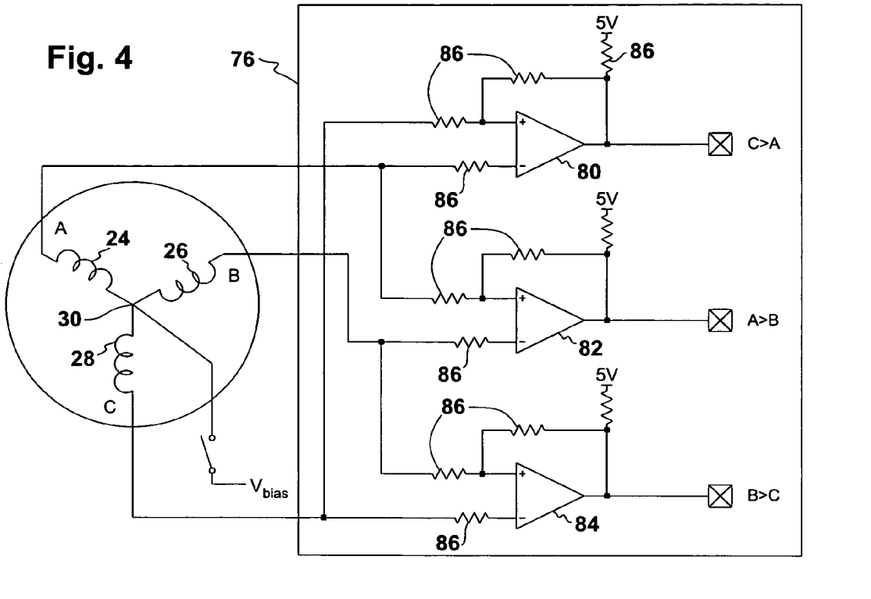
FIG. 4 is a high-level schematic diagram of a circuit for analyzing response signals in accordance with the method and system of the present invention.
Figure 5:
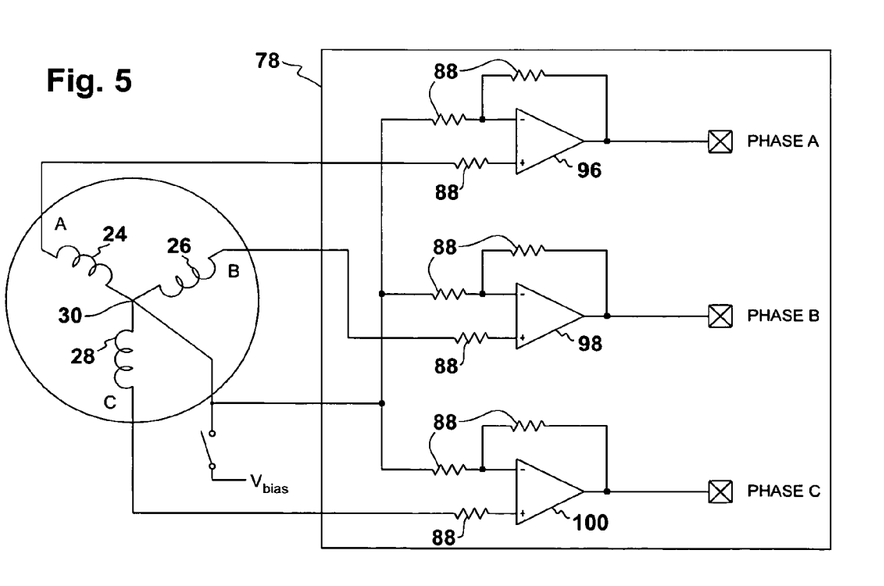
FIG. 5 is a high-level schematic diagram of an alternate circuit for analyzing response signals in accordance with the method and system of the present invention.

Two methods and systems for analyzing induced response signals on the stator windings are shown in FIGS. 4 and 5. In a preferred embodiment, which is depicted in FIG. 4, an absolute or trapezoidal method for computing a rotor position is depicted. This method compares the magnitude of one induced signal to the magnitude of one or two other induced signals. As illustrated, one terminal of each wye-connected stator windings 24–28, labeled A–C, respectively, is connected to each of comparators 80–84 in position calculator circuit 76. Resistors 86 are used to stabilize and set the comparators to a known state.

A "1" or true output from comparator 80 indicates that the magnitude of the induced response signal in stator winding C 28 is greater or more positive than the induced signal in stator winding A 24. Similarly, a true output from comparator 82 indicates the magnitude in stator A 24 is greater then B 26, and a true output from comparator 84 indicates that the magnitude in stator B 26 is greater than C 28. A voltage, $V_{bias}$, may be applied to common node 30 when the phases are being sensed or measured in order to place the sensed signal in a selected voltage range. $V_{bias}$ may be set to any voltage inside of the common mode range of comparators 80–84.

FIG. 5 illustrates a method of determining a rotor position that uses analog measurements of response signals to calculate the rotor position. In a manner similar to that shown in FIG. 4, stator windings 24–28 are connected to operational amplifiers 96–100 in position calculating circuit 78. Resistors 88 are used to bias and set the gain of op amps 96–100. The voltages output by op amps 96–100 may be input into analog-to-digital (A-to-D) converters to produce digital values that can be analyzed mathematically to more exactly determine the rotor position. This method may be needed when the position of the rotor is extremely sensitive or critical to selecting the proper stator windings that will be driven to start the motor. $V_{bias}$ is applied to common node 30 when the voltages are read, and may be set to the center voltage of the common mode range of op amps 96–100. Gains should be set so that outputs of op amps 96–100 do not exceed the input range of the A-to-D converters.

Figure 6:
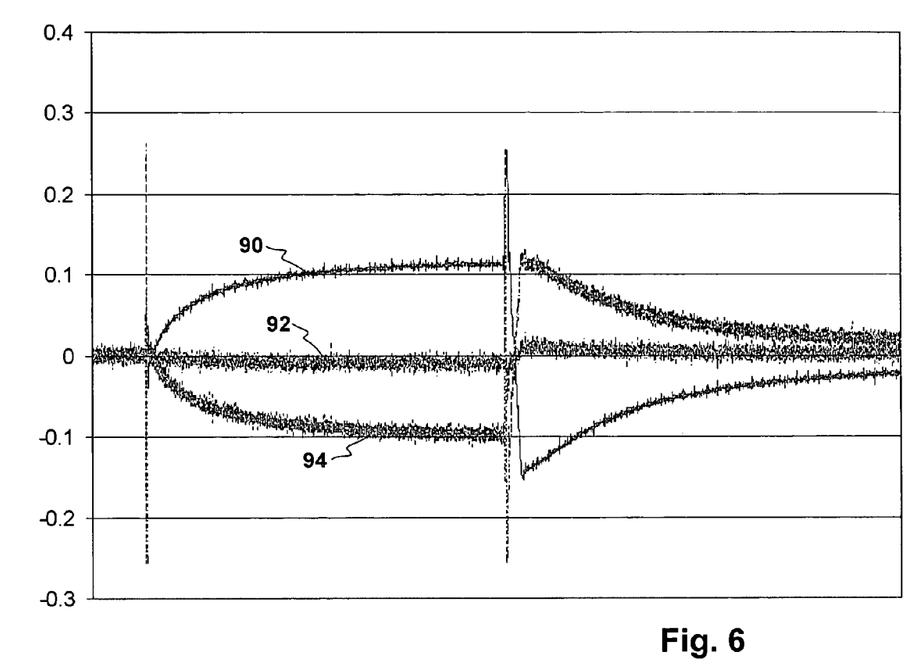
FIG. 6 is a representation of phase voltages measured in motor windings in accordance with the method and system of the present invention.

FIG. 6 shows an example of induced response signals on the stator windings, which may be input into comparators 80–84 of FIG. 4, or op amps 96–100 of FIG. 5, for analysis to determine the rotor position. The three signals in FIG. 6 are marked with reference numerals 90–94. These signals 90–94 represent induced response signals in windings 24–28 (see FIG. 2), respectively, which may be measured at inputs 56 of motor controller 34.

Induced response signals 90–94 are produced by pulsing rotor winding 22 to produce a changing current within the winding. Rotor winding 22 is inductively coupled to each stator winding 24–28, but because of the angular arrangement of the different stators, the electromagnetic coupling between rotor 22 and each stator winding 24–28 is different, which produces induced signals having different polarities and magnitudes. The magnitudes of the induced signals varies trigonometrically with the angle between the stator magnetic field vector and the rotor magnetic field vector.

Rotor position may be determined by the relative voltage level seen at the stators. This voltage can be calculated by the following equations.

$$V_A = V_{max} \cos(\omega)$$

$$V_B = V_{max} \cos(\omega + 120)$$

$$V_C = V_{max} \cos(\omega + 240)$$

Where ω is the angle 70 between the rotor field vector and the plane perpendicular to the field vector of stator winding A (see FIG. 2). Angle (ω+120) is shown at 70' and angle (ω+240) is shown at 70". $V_{max}$ is derived from the turns ratio between wound rotor 22 and stator windings 24–28, the rate of change in the rotor current, and the flux connection between stator windings 24–28 and wound rotor 22. $V_A$, $V_B$, and $V_C$ are the induced voltages seen across the specific stator winding 24–28.

The sum of voltages $V_A$, $V_B$, and $V_C$ should always equal zero. Therefore, the voltage of two stator phases can be measured, and the third can be calculated as follows:

$$V_A + V_B + V_C = 0$$

$$V_A + V_B = -V_C$$

Figure 7:
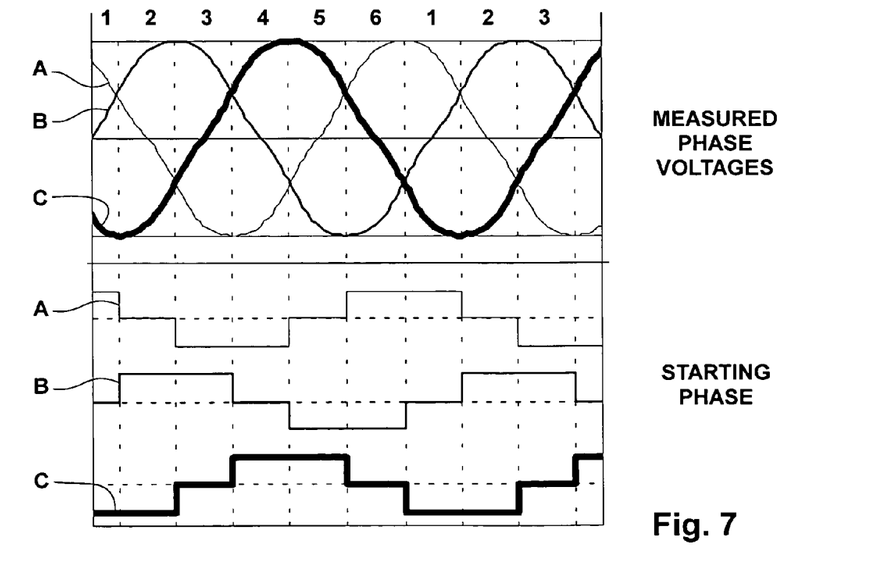
FIG. 7 is a representation of measured phase voltages and corresponding drive voltages selectively applied to motor stator windings in accordance with the method and system of the present invention.

A preferred process for selecting a starting step from the six-step sequence for operating the motor is illustrated by the graph in FIG. 7. The top of the graph is labeled with the six steps of the commutation sequence. Sine waves represent relative phase voltage measurements for phases A, B, and C in response to excitation by a pulse on the rotor. Square waveforms represent the timing of commutated voltages on stator windings of phases A, B, and C during normal operation. The voltages represented in the three-level waveform are a high drive voltage, a low drive voltage, and an open winding state. The waveforms can be used to indicate or calculate waveforms by comparing relative phase voltages (as discussed and summarized in Table 1, below).

If rotor 22 is pulsed when it is in a rotational position to produce a magnetic vector 90° from a magnetic angle of a particular stator winding, the pulse produces the maximum induced response, with either a positive or negative polarity. Conversely, if the magnetic vector of the pulsed rotor is aligned with the magnetic axis of a stator winding, a small induced response is produced.

In the example shown in FIG. 6, signal 90 has a positive polarity and the highest magnitude. Signals 92 and 94 have negative polarities, with signal 94 having the second largest magnitude and signal 92 having the smallest magnitude. If the angle of rotor 22 that produced these signals was changed, at least two of these three signals would have different characteristics, wherein the magnitudes, the polarities, or both would be different.

When the induced response signals of FIG. 6 are analyzed in the position calculator circuit 76 of FIG. 4, wherein signals 90–94 represent signals in stator windings 24–28, respectively, the outputs of comparators 80–84 have a binary value 011, where a 1 indicates a true condition. This binary value indicates that signal C is not greater than signal A, signal A is greater than signal B, and signal B is greater than signal C. Using a processor or microcontroller, this Boolean information may be used to logically determine that the rotor position is within a 60° window or range of positions, such as range 102 shown in FIG. 2. Because the stator drive is commutated every 60°, this 60° range may be all that is needed to correctly select signals that drive the appropriate stator windings in order to pull the rotor with the largest possible torque, either in synchronous operation, or when the rotor is started from a stationary position. In many instances, knowing the rotor position with greater accuracy would not change the selection of the configuration of the stator drive circuit. If the rotor is positioned anywhere in range 102, there is a maximally effective stator drive configuration selection for producing maximum starting or operating torque.

Returning now to block 204 in FIG. 3, the "no" branch is followed in an alternative method of computing the rotor position where the stator winding is pulsed. Following the pulse of a selected stator winding, the process senses and stores characteristics of a first induced response signal on the rotor winding, as illustrated at block 210. The characteristics of this first response are stored because the first response signal will be analyzed together with a second response signal in order to resolve an ambiguity in rotor position wherein a single response signal may have characteristics that represent two rotor positions.

The pulse on the stator winding is similar to the pulse described above that may be used to pulse the rotor winding. The characteristics that are stored are similar to those discussed in relation to the analysis of block 208, which characteristics include polarity and magnitude of the first induced response signal. The first induced response signal on the rotor will appear similar to one of the signals illustrated in FIG. 6.

Next, the process selects a different one of the stator windings, the second stator winding, and pulses the second stator winding, as depicted in block 212. After this second pulse, the process senses characteristics of the second induced response signal on the rotor winding, as illustrated at block 214. In a preferred embodiment, the second induced response signal characteristics are stored as described in block 210. However, storage may not be needed if position computing circuitry can compare the stored characteristics of the first signal with the sensed characteristics of the second signal as it is sensed in real time.

Thereafter, the process analyzes the characteristics of the first and second induced response signals on the rotor winding to compute the rotor position, as depicted at block 216. The process of analyzing the first and second induced response signals is similar to the processes discussed with respect to block 208, wherein amplitudes and polarities of the signals are converted to a rotor position through a formula or use of a look-up table, or where the relative magnitudes of the signals are compared and the rotor position is calculated to be within a range of degrees according to a logic table.

While the method of pulsing stator windings and sensing a rotor winding is shown in FIG. 3 using two pulses on two different stators, the method may be extended to include three stator pulses, which would not add much complexity or time, and may improve accuracy of the rotor position calculation if needed.

After the rotor position is computed, the process configures a stator drive circuit for starting the rotation of the rotor of the BLDC motor using the computed rotor position, as depicted at block 218. As discussed above, the rotor position may be computed with several different methods depending upon the resolution required and depending upon whether the rotor or the stator is pulsed. Given a range of degrees of the computed rotor position, or a more exact computation of the rotor position, there exists a pair of stator windings and a direction of current flow that will produce a maximum torque force on the rotor. In a three-phase stator system, the 360° range of possible rotor locations may be divided into six segments of 60°, as shown, for example, at range 102 in FIG. 2. For each 60° segment corresponding to output values of circuit 76 of FIG. 4, there is an associated stator drive configuration shown in Table 1, below. Thus, block 210 may be implemented with a look up table to convert a calculated rotor position or measured relative magnitudes into a configuration that selects one stator to receive a high drive voltage and another stator to receive a low drive voltage.

TABLE 1

| Relative Phase Comparison | | | Driving Phases | |
|---|---|---|---|---|
| C > A | A > B | B > C | Drive High | Drive Low |
| 0 | 1 | 1 | A | C |
| 0 | 0 | 1 | B | C |

TABLE 1-continued

| Relative Phase Comparison | | | Driving Phases | |
| --- | --- | --- | --- | --- |
| C > A | A > B | B > C | Drive High | Drive Low |
| 1 | 0 | 1 | B | A |
| 1 | 0 | 0 | C | A |
| 1 | 1 | 0 | C | B |
| 0 | 1 | 0 | A | B |

The next step in starting the motor is energizing the wound field rotor and energizing the configured stators so that the rotor begins accelerating from its stationary position, as shown in block 220. Once the rotor and selected stators have been energized, the process delays for a period of time to permit the rotor to rotate toward the next commutation point, as depicted in block 222.

After a short delay, the process may pulse the current in the wound field rotor and sense induced response signals on two or more stator windings, as depicted in block 224. Since the rotor is moving at this point, and the rotor winding has current flowing through it, the pulse in block 216 may be a "negative pulse," or a pulse that temporarily reduces or removes voltage from the rotor to induce a changing field current. When current is changing in the rotor, response signals are induced in the stator windings as described above.

In order to sense these signals induced by the negative pulse, it may be necessary to remove the drive power from the stator windings so that they are floating, as described above in relation to block 206. Alternatively, some sense circuits may be sensitive enough to detect the small induced signals on top of the large drive signal for the stator windings. In yet another alternative, a series of negative pulses may be used to induce signals on the one floating winding of the three-phase stator wherein more than one pulse within a short duration would be necessary to resolve ambiguous indication of rotor location that comes from a single stator winding with a single pulse.

After pulsing the current in the rotor, the process recomputes the rotor position and reconfigures the stator drive circuit in response to the newly computed rotor position, as illustrated at block 226. Thus, if the newly calculated rotor position indicates that the rotor has passed the next commutation point, the stator drive 58 is set to a new configuration to rotate the stator magnetic field at a rate that matches the accelerating rotor. As shown at decision block 228, the process then determines whether or not the rotor needs additional acceleration to come up to operating speed, or at least up to a speed that permits back EMF detection. If the rotor needs additional acceleration, the process delays, at block 222, and pulses and calculates the new rotor position, as described above in relation to blocks 224 and 226. If the rotor has achieved sufficient speed, the process of starting the rotor ends at block 230.

Figure 8:
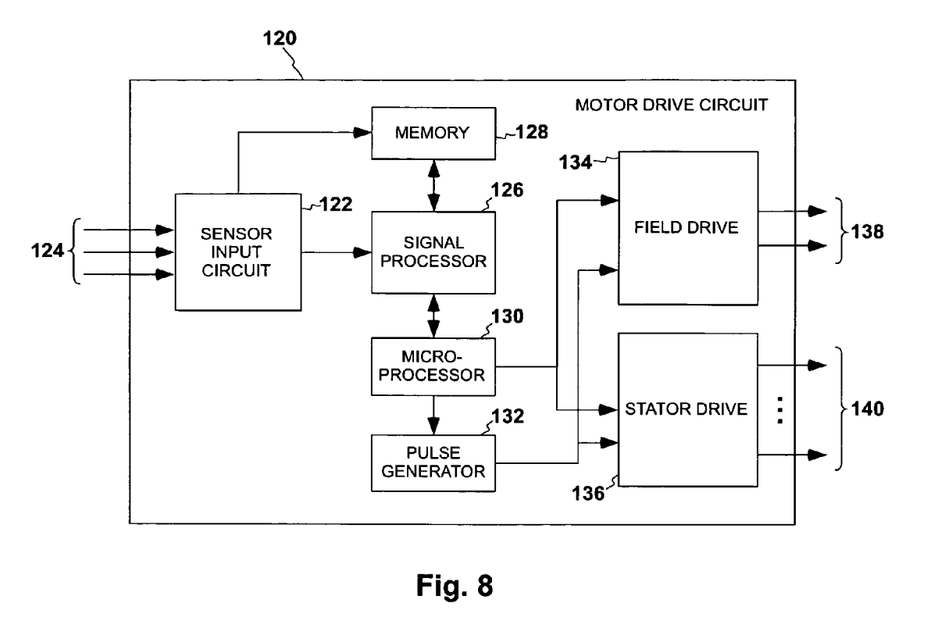
FIG. 8 is a high-level block diagram of a DC motor drive and rotor position on detection circuit in accordance with the method and system of the present invention.

Referring now to FIG. 8, there is depicted a high-level schematic block diagram of a circuit for calculating a wound field rotor position in a BLDC motor in accordance with the method and system of the present invention. As illustrated, motor drive circuit 120 includes sensor input circuit 122, which has inputs 124 coupled to sense voltages on stator windings 24–28 of a wound rotor BLDC motor 20 in a configuration similar to that shown in FIG. 1. The purpose of sensor input circuit 122 is to condition, and possibly filter voltage signals present on the various windings in BLDC motor 20. Additional input connections, not shown in FIGS. 1 and 8, may also include connections for sensing induced signals in rotor winding 22. Additionally, an optional input for signal 41 connected common node 30 (see FIG. 1) may be included to provide a voltage reference for measuring signals on the other stator windings. In a preferred embodiment, sensor input circuitry 122 may be implemented with typical circuitry currently used to condition signals for detecting back EMF zero crossings.

Sensor input circuit 122 has an output (or outputs) coupled to an input of signal processor 126. Signal processor 126 may include an analog-to-digital converter for digitally quantifying a signal so that characteristics of the signal may be stored in memory 128 or passed to processor 130. Data passed to memory 128 is typically stored temporarily so that it can be recalled and analyzed after additional data has been collected. In a simple embodiment, signal processor 126 may include a sample and hold circuit that does not capture the waveform of the signal on a motor winding, and in a more complex embodiment, signal processor 126 may include a circuit to more precisely digitize a waveform to be used in a more detailed analysis. Other embodiments of signal processor 126 may include position calculator circuits 76 and 78, which are described above and shown in FIGS. 4 and 5.

Processor 130 is coupled to signal processor 126 for receiving data describing the characteristics of signals on a winding of the BLDC motor. Such characteristics include signal measurements, or relative signal measurements. Processor 130 analyzes these signal characteristics to compute a position of a wound field rotor with an accuracy needed to select stator windings to produce maximum torque when starting the motor in a forward direction without prepositioning the rotor. Depending upon the method of calculation used, the rotor position may be determined to be within a range of degrees, or may be determined to be at a particular position expressed in degrees. Processor 130 may be a special purpose, application specific integrated circuit, or a more generally programmable microprocessor or microcontroller, such a motor control circuit.

Processor 130 is also coupled to pulse generator 132, field drive circuit 134, and stator drive circuit 136. Pulse generator 132 receives control signals from processor 130 when it is time to select and pulse a particular winding, such as one of the stator windings 24–28 or rotor winding 22, in the BLDC motor 20 (see FIG. 1). Control signals sent from processor 130 may also include characteristics of the pulse, such as an amplitude or duration.

Pulse generator 132 is coupled to field drive circuit 134 and stator drive circuit 136 with control signals necessary to configure the selection of a winding, and signals to produce the proper pulse for a selected winding to detect the rotor position. Processor 130 is similarly connected to field drive circuit 134 and stator drive circuit 136 in order to select and control the drive of the stator and rotor windings in a conventional manner after the motor is started and running.

Field drive circuit 134 has outputs 138 coupled to terminals of the field or rotor winding 22. Field drive circuit 134 may also include transistors or other electronic switching that can connect one terminal of rotor winding 22 to ground, or a bias voltage, while the other terminal is left floating for sensing induced signals. An example of field drive circuit 134 is shown in FIG. 1 at reference numeral 32.

Stator drive circuit 136 includes switches, which are preferably transistors, necessary to apply drive power at outputs 140, which are coupled to stator windings 24–28. During normal BLDC motor operation, stator windings 24–28 are selected two at a time and current is driven through pairs of stator windings in a selected direction (see FIG. 2). For a three-winding, three-phase motor, stator drive circuit 136 is typically placed in one of six states during normal motor commutation. These six states include selecting one of three pair combinations of stator windings to be driven by a current in one of two directions. An example of stator drive circuit 136 is shown in FIG. 1 at reference numeral 58.

Stator drive circuit 136 may also be configured to pulse a particular stator winding, or pulse a particular pair of stator windings. For example, if a single stator winding is pulsed, power may be applied to the winding input while common node 30 may be held at ground potential.

Both field drive circuit 134 and stator drive circuit 136 may be configured to produce a pulse by control signals from pulse generator 132. As described above, such pulse configurations are just for determining rotor position, and are not configurations normally used to drive or move rotor 22.

It should be apparent to persons skilled in the art that the present invention provides a method and system that does not use added sensors for determining the position of a wound field rotor when the rotor is stationary before starting, or otherwise turning slowly and unable to produce back EMF signals. Determining the rotor position is important when the motor cannot be propositioned or moved in the reverse direction before starting. Detecting the rotor position without added sensors improves reliability and decreases system cost.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for determining a rotor position in a DC motor having a plurality of windings, including a rotor winding and a plurality of stator windings, comprising the steps of:
    producing a changing current flow in a pulsed winding to induce a response signal in other windings of the plurality of windings;
    in response to the pulsed winding being the rotor winding, performing the step of analyzing response signals induced in two of the stator windings to compute the rotor position;
    in response to the pulsed winding being one of the stator windings, performing the steps of:
        storing a characteristic of the response signal induced in the rotor winding;
        producing a changing current flow in a different one of the stator windings to induce a second response signal in the rotor winding; and
        analyzing the stored characteristic of the response signal induced in the rotor winding and the second response signal induced in the rotor winding to compute the rotor position.

2. The method for determining a rotor position according to claim 1 wherein the step of producing a changing current flow in a pulsed winding to induce a response signal in other windings of the plurality of windings further includes applying a voltage pulse to a wound field rotor to produce a current changing at a constant rate that induces a response signal in each of the plurality of stator windings.

3. The method for determining a rotor position according to claim 1 wherein the steps of:
    producing a changing current flow in a pulsed winding to induce a response signal in other windings of the plurality of windings;
    storing a characteristic of the response signal induced in the rotor winding;
    producing a changing current flow in a different one of the stator windings to induce a second response signal in the rotor winding; and
    analyzing the stored characteristic of the response signal induced in the rotor winding and the second response signal induced in the rotor winding to compute the rotor position;
    further include the steps of:
    applying a voltage pulse to a first stator winding to produce a current changing at a constant rate that induces a first response signal in the rotor winding;
    storing a characteristic of the first response signal;
    applying a second voltage pulse to a second stator winding to produce a current changing at a constant rate that induces a second response signal in the rotor winding; and
    analyzing the stored characteristic of the first response signal induced in the rotor winding and the second response signal induced in the rotor winding to compute the rotor position.

4. The method for determining a rotor position according to claim 1 wherein the step of producing a changing current flow in a pulsed winding further includes applying a voltage pulse to a pulsed winding, wherein the voltage pulse has a substantially square wave shape having a duration of less than 10 milliseconds.

5. The method for determining a rotor position according to claim 1 wherein the step of producing a changing current flow in a pulsed winding to induce a response signal in other windings of the plurality of windings further includes applying a voltage pulse to the rotor winding while the rotor is stationary to induce a response signal in each of the plurality of stator windings.

6. The method for determining a rotor position according to claim 1 wherein the step of producing a changing current flow in a pulsed winding to induce a response signal in other windings of the plurality of windings further includes applying a voltage pulse to the rotor winding while the rotor is rotating to induce a response signal in each of the plurality of stator windings.

7. The method for determining a rotor position according to claim 6 wherein the step of producing a changing current flow in a pulsed winding to induce a response signal in other windings of the plurality of windings further includes transiently decreasing a drive voltage to a wound field rotor while the rotor is rotating to induce a response signal in each of the plurality of stator windings.

8. The method for determining a rotor position according to claim 1 wherein the step of analyzing response signals induced in two of the stator windings to compute the rotor position further includes measuring the amplitude and polarity of response signals induced in two of the stator windings to compute the rotor position.

9. The method for determining a rotor position according to claim 1 wherein the step of analyzing response signals induced in two of the stator windings to compute the rotor position further includes comparing the response signals induced in each of the stator windings to the response signals induced in each of the other stator windings to compute the rotor position.

10. The method for determining a rotor position according to claim 1 wherein the plurality of stator windings in the DC motor includes A, B, and C wye-connected stator windings that are sequentially angularly spaced apart, and wherein step of analyzing response signals induced in two of the stator windings to compute the rotor position further includes the steps of:
    comparing a pulse response signal in the A stator winding to a pulse response signal in the B stator winding;
    comparing a pulse response signal in the B stator winding to a pulse response signal in the C stator winding; and
    comparing a pulse response signal in the C stator winding to a pulse response signal in the A stator winding.

11. The method for determining a rotor position according to claim 10 further including the steps of:
    in response to the determining that:
        the pulse response signal in the C stator winding is not greater than the pulse response signal in the A; and
        the pulse response signal in the A stator winding is greater than the pulse response signal in the B stator winding; and
        the pulse response signal in the B stator winding is greater than the pulse response signal in the C stator winding;
    configuring a stator drive circuit for rotating the rotor of the DC motor by selecting the A stator winding for connection to a high stator drive voltage and selecting the C stator winding for connection to a low stator drive voltage.

12. A system for determining a rotor position in an automobile alternator having a plurality of windings, including a wound field rotor winding and a plurality of wye-connected stator windings, the system comprising:
    a pulse generator for producing a changing current flow in the wound field rotor winding to induce a response signal in each of the wye-connected stator windings;
    a sensors coupled to the wye-connected stator windings for measuring response signals in the wye-connected stator windings; and
    comparators coupled to the sensors for simultaneously comparing selected pairs of response signals induced in the wye-connected stator windings to compute the rotor position.

13. A system for determining a rotor position in a motor having a plurality of windings, including a wound field rotor winding and a plurality of wye-connected stator windings, the system comprising:
    a pulse generator for producing a changing current flow in the wound field rotor winding to induce a response signal in each of the wye-connected stator windings;
    a sensors coupled to the wye-connected stator windings for measuring response signals in the wye-connected stator windings; and
    an analyzer coupled to the sensors for analyzing polarities and magnitudes of the induced signals in the sensed windings to compute the rotor position.

14. The system for determining a rotor position according to claim 13 wherein the analyzer further includes comparators for simultaneously comparing selected pairs of response signals induced in the plurality of wye-connected stator windings.

15. The system for determining a rotor position according to claim 13 wherein the DC motor is an automobile alternator having a wound field rotor and wye-connected stator windings.

* * * * *